(12) United States Patent
Taylor et al.

(10) Patent No.: US 9,325,666 B2
(45) Date of Patent: *Apr. 26, 2016

(54) SECURELY VIRTUALIZATING NETWORK SERVICES

(71) Applicant: Aruba Networks, Inc., Sunnyvale, CA (US)

(72) Inventors: John Taylor, Tiburon, CA (US); Randy Chou, San Jose, CA (US); Pradeep Iyer, Cupertino, CA (US); Dave Logan, Menlo Park, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,788

(22) Filed: Dec. 22, 2014

(65) Prior Publication Data

US 2015/0229606 A1 Aug. 13, 2015

Related U.S. Application Data

(63) Continuation of application No. 11/929,410, filed on Oct. 30, 2007, now Pat. No. 8,949,965.

(51) Int. Cl.
*G06F 9/00* (2006.01)
*H04L 29/06* (2006.01)
*G06F 21/53* (2013.01)
*H04L 29/08* (2006.01)

(52) U.S. Cl.
CPC ............... *H04L 63/02* (2013.01); *G06F 21/53* (2013.01); *H04L 63/1441* (2013.01); *H04L 67/10* (2013.01); *H04L 67/16* (2013.01); *H04Q 2213/13095* (2013.01); *H04Q 2213/13106* (2013.01); *H04Q 2213/13196* (2013.01); *H04Q 2213/13339* (2013.01); *H04Q 2213/13399* (2013.01)

(58) Field of Classification Search
CPC .............................. H04L 63/02; G06F 21/53
USPC ........................................................ 726/11
See application file for complete search history.

(56) References Cited

U.S. PATENT DOCUMENTS

| | | | | |
|---|---|---|---|---|
| 5,828,893 | A * | 10/1998 | Wied et al. | 709/229 |
| 7,401,355 | B2 * | 7/2008 | Supnik et al. | 726/11 |
| 7,987,497 | B1 * | 7/2011 | Giles et al. | 726/2 |
| 2006/0130134 | A1 * | 6/2006 | Colas | 726/11 |
| 2006/0190998 | A1 * | 8/2006 | Aiello et al. | 726/11 |
| 2006/0236127 | A1 * | 10/2006 | Kurien et al. | 713/193 |
| 2007/0294754 | A1 * | 12/2007 | Finkelstein et al. | 726/11 |
| 2008/0022385 | A1 * | 1/2008 | Crowell et al. | 726/11 |

* cited by examiner

*Primary Examiner* — Amare F Tabor
(74) *Attorney, Agent, or Firm* — Mannava & Kang, P.C.

(57) ABSTRACT

Services in a network device are added through providing virtual environments. Virtualization allows services based on other platforms or architectures to be run with minimum modification and in a secure manner. Connecting services to the host through a stateful firewall allows dynamic integration, and passes only traffic of interest to the service. Virtualization allows services written for different instruction architectures to be supported. Multiple virtualized environments each supporting a service may be run.

21 Claims, 2 Drawing Sheets

US 9,325,666 B2

SECURELY VIRTUALIZATING NETWORK SERVICES

BACKGROUND OF THE INVENTION

The present invention relates to adding network services to a system, and more particularly, to securely adding network services to a system such as an embedded system through virtualization.

Systems builders, particularly builders of complex digital systems such as network switches, network controllers, access points, and other digital infrastructure systems, often wish to augment the capabilities of their products.

One way to do this is to integrate third party software into the system to provide additional capabilities. For the systems builder, this approach offers several advantages. It can reduce research and development time by integrating already existing software into a product, and possibly in areas where the systems builder does not have the same level of expertise.

Such integration of third party software also poses significant problems. Such integration usually entails retargeting the third party software to a different system than that on which it normally operates; this requires access to source code. The third party developer may not wish to provide access to source code, or the systems builder may not be able to meet the financial expectations of the third party developer to gain source code access.

Even if the systems builder can gain access to source code, that code must be ported and made operational in the systems builder's target environment. A number of factors may collude to make such a port exciting. The third party developer may not be willing or able to provide detailed technical support for such a port, or the systems builder may not be willing to pay the developer for the support required. Additionally, the third party code may not have been written with porting in mind, may contain significant dependencies on the system/architecture for which it was developed, and may not be completely documented.

Once a port has been accomplished, additional difficulties are still present. Does the ported third party code play well with the remainder of the system? When issues such as bugs are discovered with the service added by the ported third party code, are the bugs in the third party service, or were they introduced by the porting effort? How are upgrades and bug fixes to the third party service to be handled?

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to securely adding services to a network device through virtualization. According to one embodiment of the invention, virtualization software running on the host provides a virtual environment hosting the third party service. The virtual environment may provide a virtualized device and instruction set architecture different than that provided by the host. Hosting the third party service in a virtual environment isolates the service from other services on the host. By connecting the virtualized third party service through a stateful firewall, only data needed for the service is passed through the firewall to the service. Multiple services may be provided by multiple virtual environments running on the same host. Services provided through virtual environments may be cascaded with other services on the device, both native and virtualized.

Figure 1:
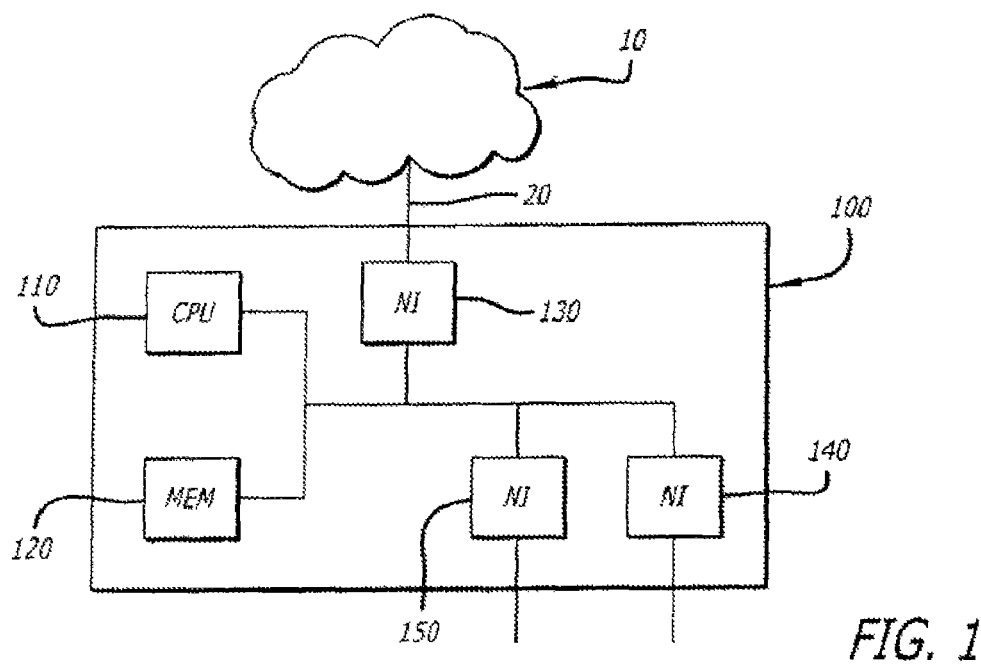
FIG. 1 shows a block diagram of a hardware device.

FIG. 1 shows a block diagram of a typical network or embedded device suitable for practicing the invention. Device 100 connects 20 to network 10. Device 100, which may be a switch, a router, or other network service provider, contains a central processing unit (CPU) 110, memory hierarchy 120, and network interface 130. Device 100 may also include additional network interfaces 140, 150. Network interfaces 130, 140, 150 are typically Ethernet interfaces, and may be wired Ethernet such as 10/100/1000 Mbit interfaces, wireless interfaces according to the 802.11 standard, or other suitable digital interfaces known to the art. Network interface 130 may also be a wired interface such as a cable or DSL modem, or a wireless connection such as WiMAX or EDGE. CPU 110 may be an IA86 processor such as those from Intel (Xeon, Pentium, Core 2, Celeron for example), AMD (Sempron, Athlon for example), or VIA, a PowerPC processor such as those from IBM or Freescale, or a MIPS processor such as those from MIPS, Cavium Networks, or Raze Microelectronics. As is understood by the art, memory hierarchy 120 includes high-speed read-write memory such as DRAM, persistent memory for system startup such as a form of read-only memory (ROM, EPROM, Flash ROM), and bulk memory such as compact flash or hard disk. One suitable hardware environment uses a MIPS64 processor from Cavium Networks for CPU 110, 256 Kb of flash memory, 32 to 512 Mb of DRAM and 256 Mb-4 Gb of compact flash bulk storage. This hardware platform runs under the control of a Linux kernel. Other operating software such as VxWorks from Wind River may also be used. Services are provided as tasks or processes running on the underlying operating system.

Figure 2:
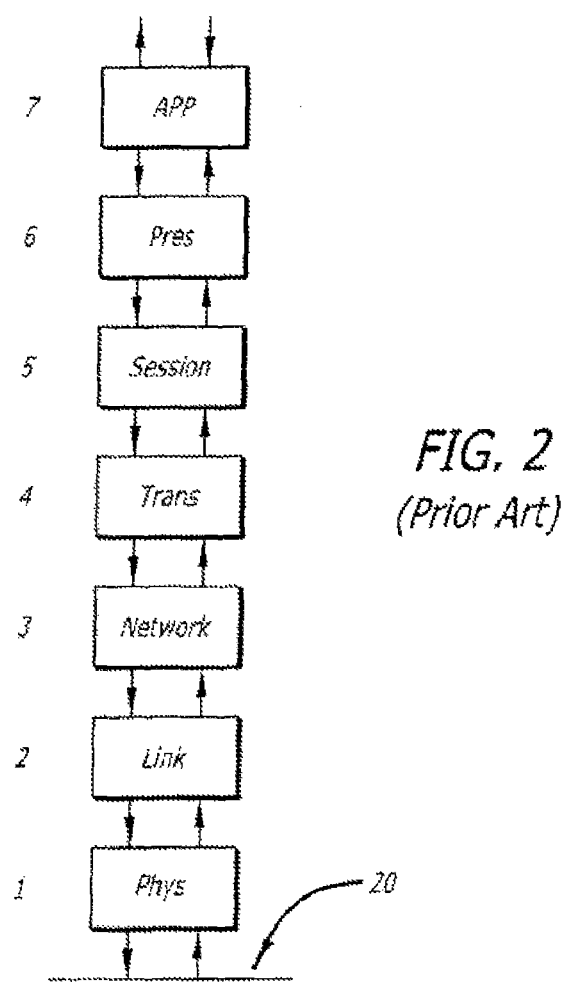
FIG. 2 shows a diagram of the OSI seven layer model.

A basic understanding of the OSI 7 layer network model as known to the art is useful. A diagram of the OSI 7 layer model is shown as FIG. 2. The OSI model provides a useful hierarchical view of network operations. In such a model, each layer only communicates with the adjacent layers. Various interface standards set the protocols used in the communications between layers.

Layers 1 through 3 are concerned with data transfer through the network media. Layer 1, the Physical layer, deals with signaling and moving bits on the medium, such as wired or wireless Ethernet. Layer 2, the Data Link layer, deals with frames and physical addressing. Layer 3, the Network layer, deals with packets, logical addressing, and path determination.

Layers 4 through 7 are the host layers. Layer 4, the Transport layer, deals with data segments and providing end-to-end connections and reliability. Layer 5, the Session layer, deals with inter-host communications. Layer 6, the Presentation layer deals with data representation and encryption. Layer 7, the Application layer, provides services to end user applications such as web browsers, e-mail services, and the like.

Figure 3:
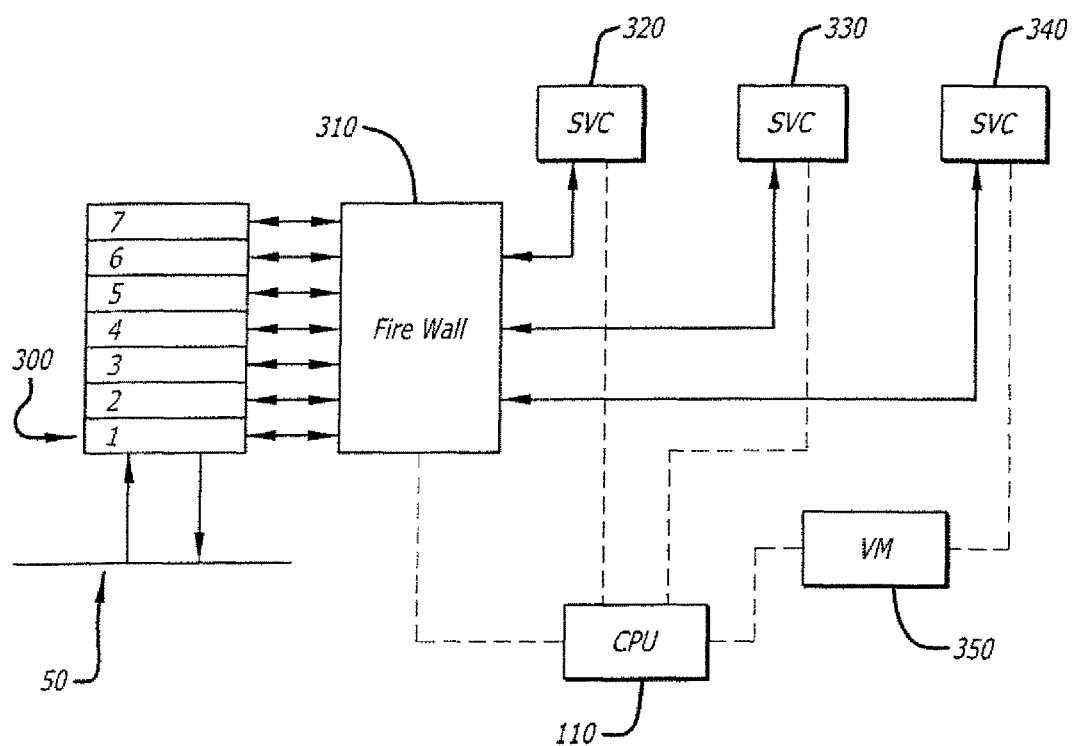
FIG. 3 shows a device environment including virtualization.

According to FIG. 3 and an embodiment of the invention, packet data on interface 50 is processed by network stack 300. Network stack 300 interfaces with firewall 310, and example services 320, 330, and 340. While network stack 300 and firewall 310 may be implemented in software running on CPU 110, it is common in the art to use varying levels of hardware acceleration to accomplish these tasks. Firewalls and stateful firewalls are known to the art. Open source firewalls are available from IPCop, IPFW, and many commercial products are available as well. Firewalls operate by inspecting packets flowing through them and applying a set of rules which determine if a packet is to be passed through the firewall, or not passed through. A stateful firewall maintains context on connections between clients on either side of the firewall, allowing packets associated with active connections to pass through, and inspecting packets and applying rules to establish and terminate connections.

As shown in FIG. 3, services 320 and 330 are native services directly supported by CPU 110. Examples of services include but are not limited to intrusion detection and prevention (IDS, IPS), packet scanning, bandwidth shaping, measurement functions, honeypots, security services, authentication services, network time servers, and the like.

In the case of a service which is not available, for example, to be run on a native MIPS64 platform, virtual machine 350 may be used to provide a virtual environment to host service 340. As an example, consider an IPSec service available for IA86 architectures. Virtual machine 350 may be used to provide the required IA86 virtual environment. An open source processor emulator suitable for virtual machine 350 for IA86 systems is available under the GNU General Public License from QEMU. An additional open source cross-platform PC emulator is available from Bochs, hosted on Source Forge. Virtual machines and virtualization is understood in the art with commercial products available from corporations such as VMWare. A virtual machine provides not only the instruction set, but also the entire virtualized platform: instruction set, memory, disk drives, network interfaces, and so on, so that the third party service thinks it is running on its native hardware.

By configuring firewall 310, only data packets of interest to service 340 are provided, protecting service 340 from unwanted traffic. As an example, a network time service operating as service 340 is only concerned with UDP traffic on port 123. Firewall 310 may be configured to route UDP traffic on port 123 to time service 340, and to only allow output UDP traffic on port 123 from time service 340. In the case of other output traffic from time service 340, firewall 310 may be set to ignore (drop) such traffic, or to signal such an event as an anomaly, through steps such as event logging, or raising an exception.

To simplify the process of integrating third party software/services, Virtual machine 350 may also be used to provide a virtual environment replicating a desired physical device, as an example, the Riverbed hardware platform from Riverbed Technology. By providing a virtualized Riverbed platform, any software released for Riverbed may be supported on the device. Similarly, a virtual machine 350 may be used to provide a virtual environment replicating a basic IA86 based computer, including network connections, to support software services written for that environment.

By connecting virtualized services through stateful firewall 310, virtualized services dynamically integrate into the host. The guest service requests specific traffic, and that traffic, and only that traffic is provided to the guest service running in the virtual environment.

A single virtual machine 350 may support multiple services 340. As an example, a single virtual machine may support a time server and a database server such as SQLite.

Multiple virtual machines 350 may be present, providing multiple virtual environments for services 340. When operating on a multi-core or multi-thread CPU 110, such as those from Cavium or Raza, it may be beneficial to dedicate threads and/or cores to virtualization services.

Since guest services run in virtual environments, any number of such services may run on the same host device. Such services may be combined and cascaded, for example, an intrusion detection-intrusion prevention service (IDS/IPS) would receive all requested traffic prior to that traffic being forwarded on to other services, such as virus scanning.

Providing virtual environments for services severely constrains the resources available to those services, providing isolation between services, and isolation from the host, providing additional security for services such as FIPS certified ciphers, or for services which are expected to be compromised, such as honeypots. The compromise or failure of a service in a virtual environment need not affect other services on the device.

While the invention has been described in terms of several embodiments, the invention should not be limited to only those embodiments described, but can be practiced with modification and alteration within the spirit and scope of the appended claims. The description is this to be regarded as illustrative rather than limiting.

What is claimed is:

1. A method of adding a service to a host device, comprising:
providing a virtual environment to support a service that is not native to the host device;
executing the service in the virtual environment; and
providing isolation between the service and the host device through an isolation component that is separate from the virtual environment, wherein a failure of the service does not cause a failure of another service connected to the host device.

2. The method of claim 1, wherein providing isolation between service and the host device comprises providing the isolation between the service and the host device by a stateful firewall.

3. The method of claim 1, further comprising executing multiple services in the virtual environment.

4. The method of claim 1, further comprising executing multiple services are in the virtual environment, wherein one of the multiple services is native to the host device.

5. The method of claim 1, wherein the virtual environment provides a different instruction set architecture than the host device.

6. The method of claim 1, wherein the service and a native service are cascaded.

7. The method of claim 1, further comprising:
providing an intrusion detection service that receives all data prior to the data being forwarded to another service.

8. A computing device, comprising:
one or more processors; and
a memory having instructions stored thereon, which when executed by the one or more processors, cause the computing device to:
provide a virtual environment to support a service that is not native to the host device;
execute the service in the virtual environment; and
provide isolation between the service and the host device through an isolation component that is separate from the virtual environment, wherein a failure of the service does not cause a failure of another service connected to the host device.

9. The computing device of claim 8, wherein the isolation between the service and the host device is provided by a stateful firewall.

10. The computing device of claim 8, wherein multiple services are executed in the virtual environment.

11. The computing device of claim 8, wherein multiple services are executed in the virtual environment, and wherein one of the multiple services is native to the host device.

12. The computing device of claim 8, wherein the virtual environment provides a different instruction set architecture than the host device.

13. The computing device of claim 8, wherein the service and a native service are cascaded.

14. The computing device of claim 8, further comprising instructions, which when executed by the one or more processors, cause the computing device to:

provide an intrusion detection service that receives all data prior to the data being forwarded to another service.

15. A non-transitory machine-readable storage medium, including instructions that when executed by a data processing apparatus, cause the data processing apparatus to:

provide a virtual environment to support a service that is not native to the host device;

execute the service in the virtual environment; and provide isolation between the service and the host device through an isolation component that is separate from the virtual environment, wherein a failure of the service does not cause a failure of another service connected to the host device.

16. The non-transitory machine-readable storage medium of claim 15, wherein the isolation between the service and the host device is provided by a stateful firewall.

17. The non-transitory machine-readable storage medium of claim 15, wherein multiple services are executed in the virtual environment.

18. The non-transitory machine-readable storage medium of claim 15, wherein multiple services are executed in the virtual environment, and wherein one of the multiple services are native to the host device.

19. The non-transitory machine-readable storage medium of claim 15, wherein the virtual environment provides a different instruction set architecture than the host device.

20. The non-transitory machine-readable storage medium of claim 15, wherein the service and a native service are cascaded.

21. The non-transitory machine-readable storage medium of claim 15, wherein the instructions are further to cause the data processing apparatus to:

provide an intrusion detection service that receives all data prior to the data being forwarded to another service.

* * * * *